(12) United States Patent
Chatham et al.

(10) Patent No.: US 11,649,973 B2
(45) Date of Patent: May 16, 2023

(54) FLUID MANAGEMENT SYSTEM AND METHOD

(71) Applicant: Transportation IP Holdings, LLC, Norwalk, CT (US)

(72) Inventors: Matthew J. Chatham, Gibsonia, PA (US); Benjamin Richard Kundman, Pittsburgh, PA (US); Andrew T. Miller, Pittsburgh, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 434 days.

(21) Appl. No.: 16/851,132

(22) Filed: Apr. 17, 2020

(65) Prior Publication Data

US 2020/0333022 A1    Oct. 22, 2020

Related U.S. Application Data

(60) Provisional application No. 62/835,213, filed on Apr. 17, 2019.

(51) Int. Cl.
| | |
|---|---|
| *F24F 3/14* | (2006.01) |
| *B01D 19/00* | (2006.01) |
| *F25B 43/00* | (2006.01) |
| *F25B 49/02* | (2006.01) |

(52) U.S. Cl.
CPC ........ *F24F 3/1405* (2013.01); *B01D 19/0057* (2013.01); *F25B 43/00* (2013.01); *F25B 49/022* (2013.01); *F25B 2400/02* (2013.01); *F25B 2600/111* (2013.01)

(58) Field of Classification Search
CPC .. B01D 19/0057; F25B 43/00; F25B 2400/02; F25B 9/004
See application file for complete search history.

(56) References Cited

U.S. PATENT DOCUMENTS

| | | | |
|---|---|---|---|
| 8,147,594 B2 | 4/2012 | Wright et al. | |
| 9,604,620 B2 | 3/2017 | Wright | |
| 10,989,451 B2 * | 4/2021 | Durrani | ............... F28D 1/05375 |

* cited by examiner

*Primary Examiner* — Ana M Vazquez
(74) *Attorney, Agent, or Firm* — The Small Patent Law Group LLC; Mary D. Lawlor

(57) ABSTRACT

A fluid management system and method includes a thermal management system disposed within a housing that includes conduits extending between a source and a destination of a first fluid. The first fluid exchanges heat with cooling devices as the first fluid moves between the source and the destination. A fluid mixture including the first fluid and a second fluid, and an exhaust are generated responsive to the first fluid exchanging heat with the cooling devices. The exhaust directed toward an outlet of the housing. A separator assembly fluidly coupled with and disposed downstream of the thermal management system receives the fluid mixture and separates the first fluid from the second fluid. The first fluid is directed in a first direction out of the separator assembly and the second fluid is directed toward the outlet to be combined with the exhaust.

20 Claims, 9 Drawing Sheets

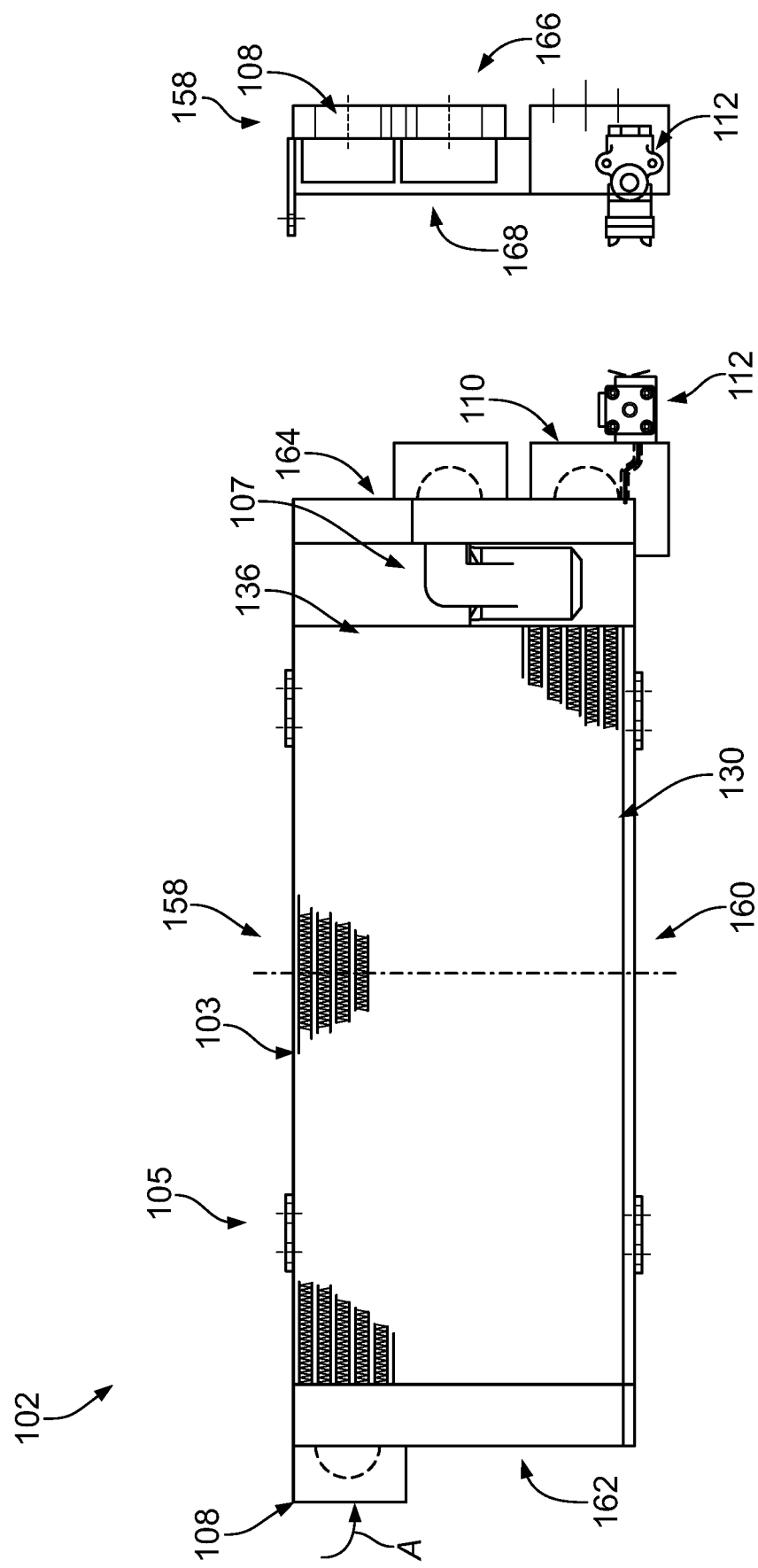

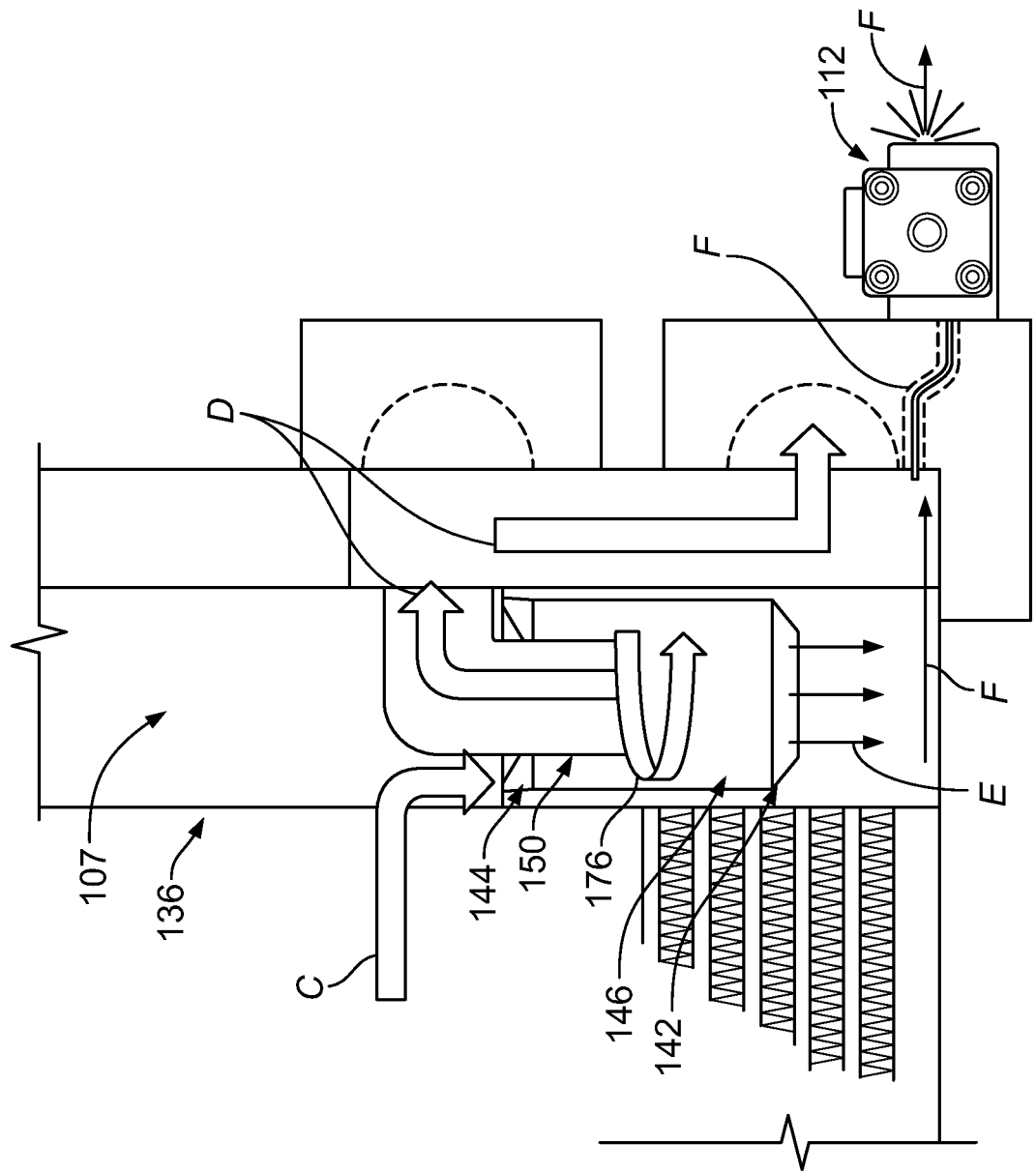

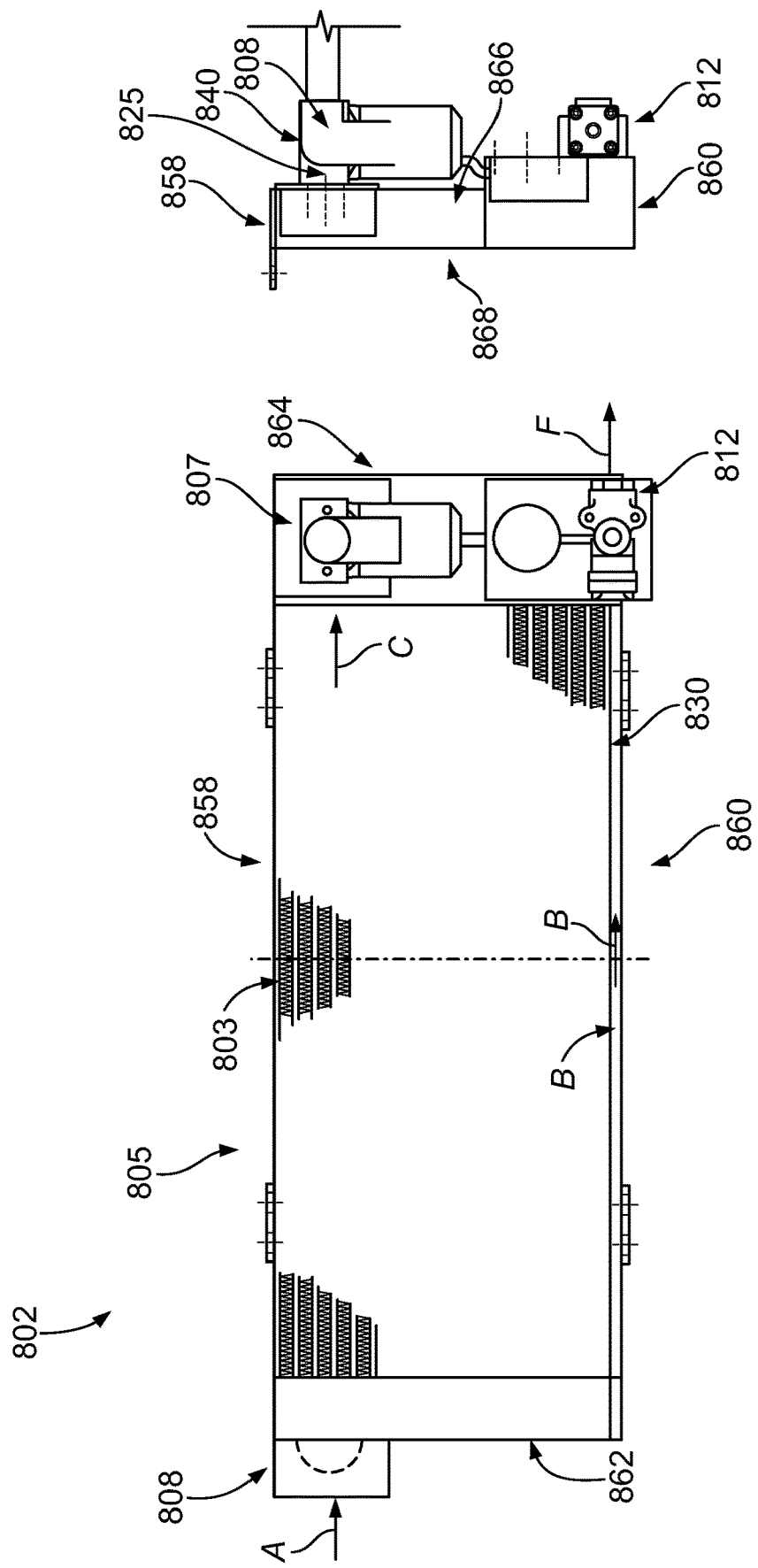

FLUID MANAGEMENT SYSTEM AND METHOD

CROSS-REFERENCE TO RELATED APPLICATIONS

This application claims priority to U.S. Provisional Application Ser. No. 62/835,213, filed Apr. 17, 2019. The entire disclosure of which is incorporated herein by reference.

BACKGROUND

Technical Field

The subject matter described relates to fluid systems and methods.

Discussion of Art

In fluid cycle systems, after a fluid is compressed, the fluid may need to be cooled, such as by directing the compressed fluid through an aftercooler. As one example, as compressed gas is cooled, moisture may form from the cooling process. In known fluid systems, the moisture may be removed from the compressed air at a subsequent stage along the compressed fluid cycle. The aftercooler may be fluidly coupled with a liquid separator that may be located downstream of the aftercooler. The liquid separator, typically a separate stage of the fluid cycle, may include a complex apparatus that removes liquid from the compressed air.

One technical problem of existing fluid cycle systems is that a liquid separator stage may be disposed a distance away from and downstream of the aftercooler stage of the fluid system. As the liquid-compressed gas mixture moves from the aftercooler toward the liquid separator, the liquid may freeze within the conduits that fluid couple the two separate stages of the fluid system. The liquid freezing within the conduits may be detrimental to the entire fluid system.

BRIEF DESCRIPTION

In one or more embodiments, a fluid management system may include a thermal management system disposed within a housing. The thermal management system includes one or more conduits extending between a source of a first fluid and a destination of the first fluid. The first fluid may exchange heat with one or more cooling devices as the first fluid moves between the source and the destination. A fluid mixture including the first fluid and a second fluid may be generated responsive to the first fluid exchanging heat with the one or more cooling devices. The thermal management system may generate an exhaust responsive to the first fluid exchanging heat with the one or more cooling devices. The exhaust may be directed out of the thermal management system toward an outlet of the housing. A separator assembly may be fluidly coupled with and disposed downstream of the thermal management system. The separator assembly receives the fluid mixture from the thermal management system. The separator assembly may separate the first fluid of the fluid mixture from the second fluid and direct the first fluid in a first direction out of the separator assembly and direct the second fluid toward the outlet to be combined with the exhaust of the thermal management system.

In one or more embodiments, a method includes exchanging heat between a first fluid that is directed between a source and a destination with one or more cooling devices. A fluid mixture is generated including the first fluid and a second fluid responsive to exchanging heat between the first fluid and the one or more cooling devices. An exhaust is generated responsive to exchanging heat between the first fluid and the one or more cooling devices. The exhaust may be directed toward an outlet. The first fluid of the fluid mixture is separated from the second fluid at a location downstream of a location of exchanging heat between the first fluid and the one or more cooling devices. The first fluid is directed in a first direction and the second fluid is directed toward the outlet to be combined with the exhaust.

In one or more embodiments, a fluid system may include a thermal management system disposed within a housing. The thermal management system includes one or more conduits extending between a source of a gas and a destination of the gas. The gas may exchange heat with one or more cooling devices as the first fluid moves between the source and the destination. A fluid mixture including the gas and a liquid may be generated responsive to the gas exchanging heat with the one or more cooling devices. The thermal management system may generate a liquid exhaust responsive to the gas exchanging heat with the one or more cooling devices. The exhaust may be directed out of the thermal management system toward an outlet of the housing. A separator assembly may be fluidly coupled with and disposed downstream of the thermal management system. The separator assembly receives the fluid mixture from the thermal management system. The separator assembly may include a chamber extending between a first end and a second end along an axis. The fluid mixture may be directed into the chamber at the first end and move from the first end in a direction toward the second end. The separator assembly may separate the gas of the fluid mixture from the liquid within the chamber. The separator assembly may include one or more conduits that direct the gas out of the chamber in a first direction, and one or more conduits to direct the liquid out of the chamber and toward the outlet to be combined with the liquid exhaust of the thermal management system.

BRIEF DESCRIPTION OF THE DRAWINGS

The inventive subject matter may be understood from reading the following description of non-limiting embodiments, with reference to the attached drawings, wherein below:

FIG. 4 illustrates a top view of a fluid management system in accordance with one embodiment;

FIG. 5 illustrates a side view of the fluid management system shown in FIG. 4;

FIG. 7 illustrates a magnified view of the flow path shown in FIG. 6;

FIG. 8 illustrates a top view of a fluid management system in accordance with one embodiment;

FIG. 9 illustrates a side view of the fluid management system shown in FIG. 8;

DETAILED DESCRIPTION

Figure 1:
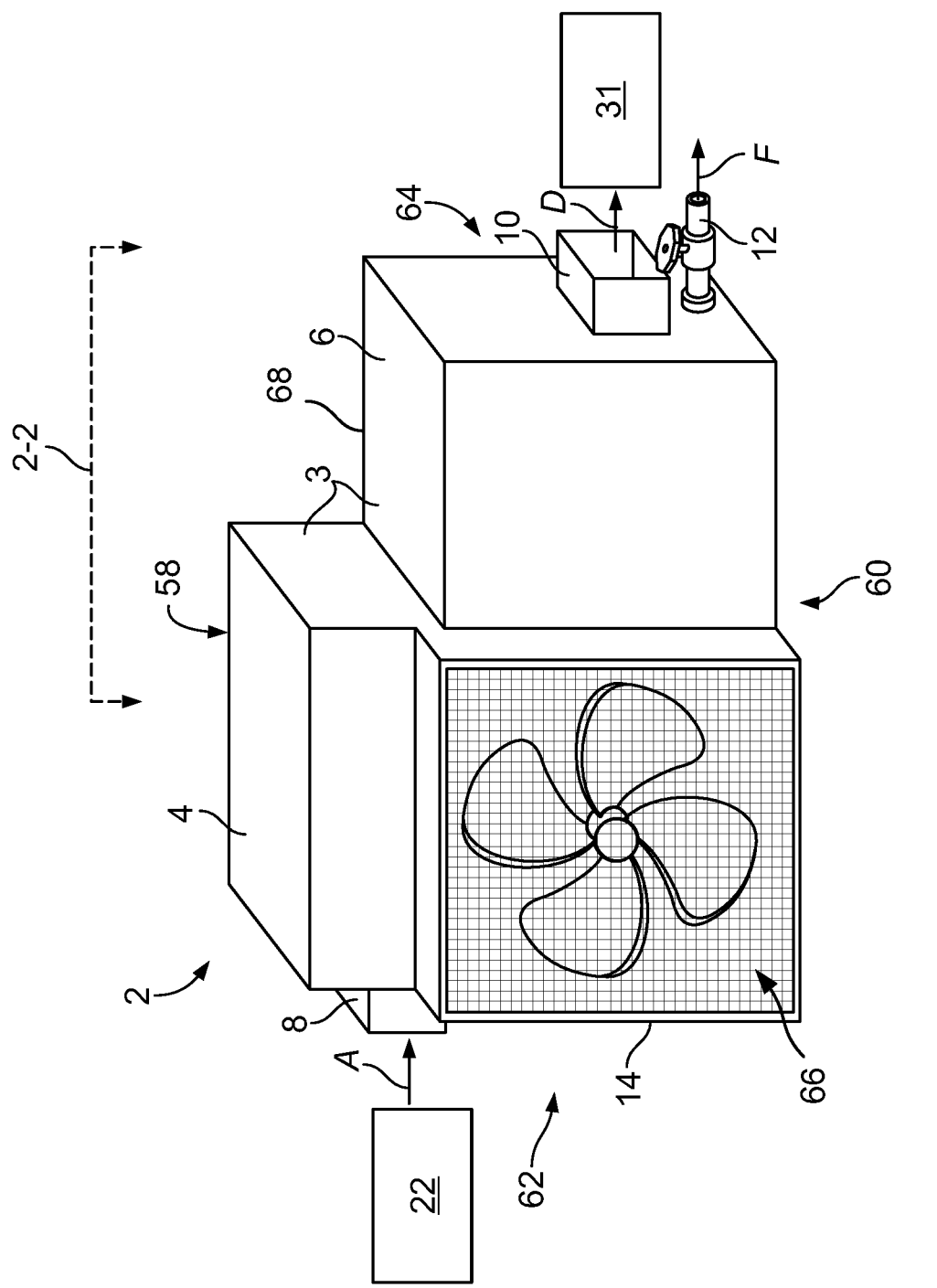
FIG. 1 illustrates perspective view of a fluid management system in accordance with one embodiment.

Embodiments of the subject matter described herein relate to fluid management systems and methods. The fluid management systems may control a temperature of one or more fluids within the system, may control the generation of one or more other fluids within the system, and may separate different fluids from each other. In one or more embodiments, the fluid management system may include a thermal management system and a separator assembly. A portion of the separator assembly and a portion of the thermal management system may be disposed within the same or a common housing. Optionally, all of the thermal management system and all of the separator assembly may be disposed within the common housing.

In one or more embodiments, the separator assembly may be disposed in a first housing, and the thermal management system may be disposed in a different housing that may share one or more surfaces, that may be coupled with each other, that may be disposed a predetermined distance apart from each other, or the like. For example, the distance between the two housings may be based on a temperature of the fluid that is directed from the thermal management system toward the separator assembly, a temperature or one or more other ambient temperatures of an area outside of the fluid management system, a type and/or amount of the fluid that may move between the thermal management system and the separator assembly, a characteristic of the movement of the fluid (e.g., a flow rate, flow volume, an amount of turbulence of the flow of the fluid, or the like), a number of conduits or channels fluidly coupling the thermal management system and the separator assembly, a size of the one or more conduits or channels fluidly coupling the thermal management system and the separator assembly, a combination of two or more, or the like.

A first fluid may be directed into the thermal management system and may exchange thermal energy with a coolant within the thermal management system. As one example, the first fluid may be compressed gas, and a temperature of the compressed gas moving within the thermal management system may be reduced. Exchanging thermal energy between the first fluid and the coolant may generate condensation. A portion of the condensation may be directed out of the thermal management system. Another portion of the condensation may be mixed or combined with the first fluid (e.g., the cooled compressed gas) to generate a fluid mixture of the first fluid and a second fluid (e.g., the condensation). The fluid mixture is directed from the thermal management system and toward the separator assembly.

The separator assembly separates the first fluid from the second fluid. For example, the separator assembly may be shaped and sized to control the movement or flow of the fluid mixture within the separator assembly to promote the separation of the first fluid (e.g., the compressed gas) from the second fluid (e.g., the liquid or condensation). The first fluid may be directed in a first direction out of the separator assembly and the second fluid may be directed in a second direction out of the separator assembly. In one or more embodiments, the second fluid may be directed toward a conduit containing the exhaust of the thermal management system. For example, the exhaust and the second fluid may be combined or mixed within the fluid management system and directed toward a common outlet of the fluid management system.

The fluid management systems described herein may be used within any compressor systems. In one or more embodiments, the fluid management systems described herein may be used in a compressor system onboard a vehicle system. The vehicle system may be a rail vehicle system having one or more rail vehicles, automobiles, trucks, buses, mining vehicles, marine vessels, aircraft (manned or unmanned, such as drones), agricultural vehicles, or other off-highway vehicles. The fluid management systems described herein may extend between two or more vehicles that may be operably coupled with each other and operate as a vehicle consist, or the fluid management systems may be disposed onboard a single vehicle of a vehicle system. Optionally, the fluid management systems may be used in a refrigeration, in any industrial fluid cycle systems, or the like.

Figure 2:
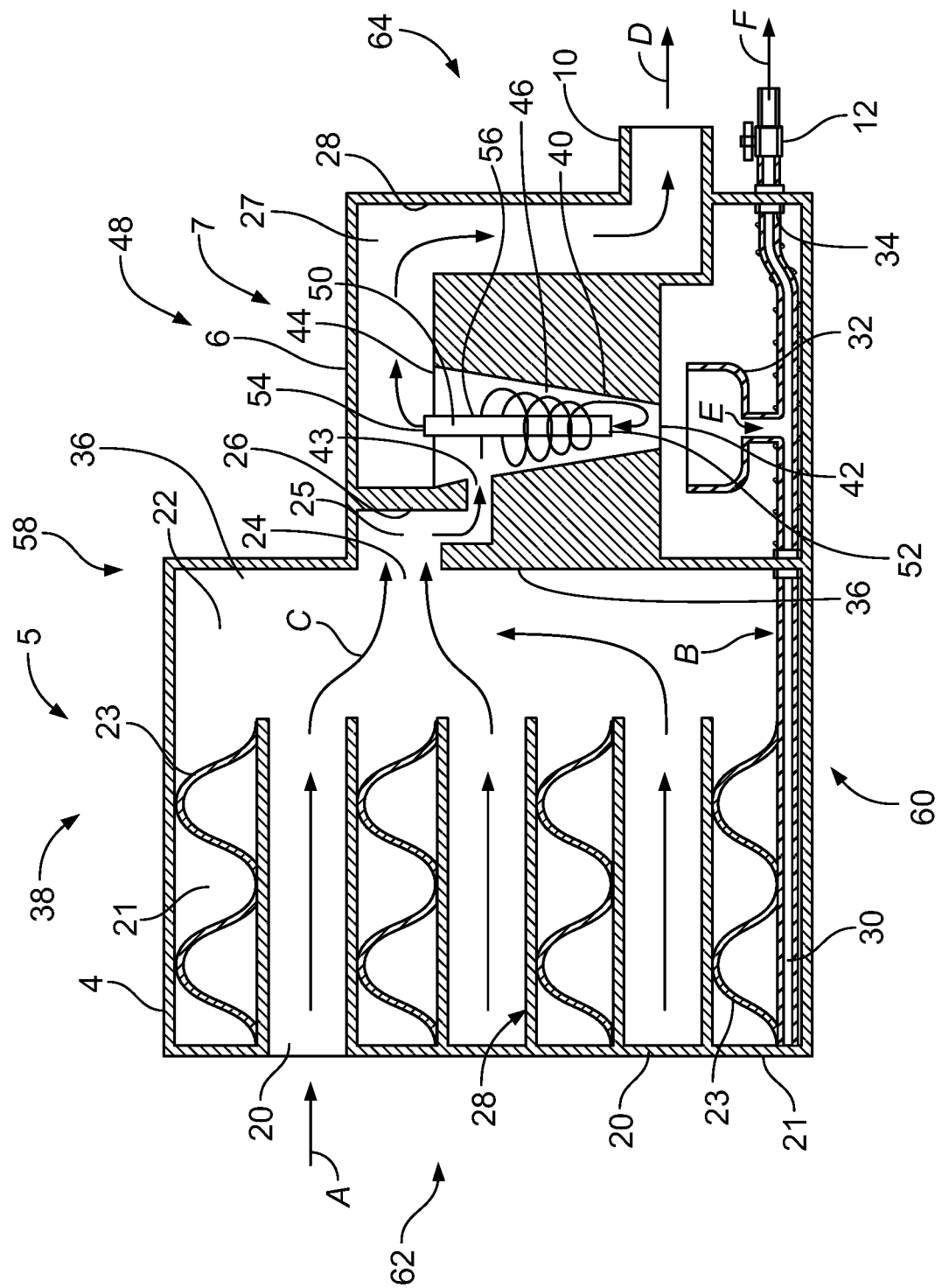
FIG. 2 illustrates a cross-sectional view of the fluid management system shown in FIG. 1 including a thermal management system and a separator assembly.

FIG. 1 illustrates perspective view of a fluid management system 2 in accordance with one embodiment. FIG. 2 illustrates a cross-sectional view of the fluid management system. The fluid management system includes a housing 3 that includes a core 4 and one or more headers 6. The housing includes plural exterior surfaces that extend and are coupled between a first end 62 and a second end 64 that is disposed substantially opposite the first end, a front side 66 and a back side 68 that is opposite the front side, and a top end 58 and bottom end 60 that is opposite the top end. The plural exterior surfaces that extend between the first and second ends, front and back sides, and top and bottom ends define the shape and size of the housing. In the illustrated embodiment of FIGS. 1 and 2, the housing is separated into a first portion of the housing 38 and a second portion of the housing 48. The housing includes plural surfaces 36 that may divide or separate the first portion of the housing from the second portion of the housing.

The fluid management system includes a thermal management system 5 that is disposed within or contained within the first portion of the housing. The thermal management system is fluidly coupled with a source 22 via one or more conduits (not shown). A first fluid or Fluid A may be directed from the source toward the housing and into the thermal management system via an inlet 8. In one or more embodiments, the source may be a compressor of a fluid cycle system, and Fluid A may be a compressed gas that is directed toward the thermal management system.

The Fluid A may exchange thermal energy with a coolant within the thermal management system. In one or more embodiments, the thermal management system may include plural fluid passages 20 and plural coolant passages 21. The Fluid A may be directed through the fluid passages and a coolant may be directed through the plural coolant passages. The Fluid A may be fluidly separate from the coolant. For example, plural surfaces 28 define and separate the fluid passages from the coolant passages. In one or more embodiments, one or more of the coolant passages may include one or more fins 23. A coolant may be directed through the plural coolant passages and may be directed around the fins. In one or more embodiments, the coolant may be a liquid, a gas, or a liquid-gas mixture.

In one or more embodiments, the coolant may be mixed or combined with the Fluid A to exchange thermal energy with the Fluid A. For example, the coolant may be a gas, such as air, that may be combined with the Fluid A (e.g., the heated compressed gas). The coolant may be directed through the housing via a fan, a blower, or any alternative fluid control device that may blow, push, and/or pull the coolant through the housing to mix or combine with the Fluid A and remove thermal energy from the Fluid A. In one or more embodiments, the thermal management system may include one or more fins that may be used to reduce a temperature of the mixture of the coolant and the Fluid A within the system.

The Fluid A moving within the fluid passages may exchange heat or thermal energy with the coolant. In one or more embodiments, the thermal management system may be referred to an aftercooler, aftercooler system, or the like, such that the thermal management system may control a temperature of the of the Fluid A and the coolant that moves within the fluid passages and coolant passages, respectively. For example, as the Fluid A moves from the inlet toward a channel 25, the Fluid A exchanges thermal energy with the coolant, such that a temperature of the Fluid A proximate the inlet may be greater than a temperature of the Fluid A at a position proximate the channel 25. Additionally, the coolant within the coolant passages proximate the first end of the housing may have a temperature that is less than a temperature of the coolant a distance away from the first end of the housing. For example, as the temperature of the Fluid A decreases from the first end of the housing moving toward the second end of the housing, the temperature of the coolant increases from the first end of the housing moving toward the second end of the housing.

In one or more embodiments, the thermal management system may include one or more fluid system elements 14 such as fans (shown in FIG. 1), blowers, pumps, or the like, that may control movement of the coolant and/or the Fluid A within the thermal management system. For example, one or more fluid system elements may control movement of the Fluid A within the thermal management system. Additionally or alternatively, one or more other fluid system elements may control movement of the coolant within the coolant passages. The same or common fluid system elements may control movement of the Fluid A and coolant. Optionally, different fluid system elements may control movement of the Fluid A and the coolant.

Responsive to the Fluid A exchanging thermal energy with the coolant within the thermal management system, Fluid B and Fluid C may be generated. The Fluid C may be or represent a fluid mixture that includes at least a portion of the compressed gas (e.g., Fluid A) having a reduced temperature relative to temperature of the Fluid A, and a second fluid. The second fluid may be a portion of condensation or liquid droplets that may be generated or formed during and responsive to the thermal transfer process within the thermal management system. For example, Fluid C is a gas-liquid mixture combination. The Fluid B may be or represent condensation that may be generated responsive to the reduction in temperature of the Fluid A. In one or more embodiments, the Fluid B may be referred to as an exhaust. For example, the amount of the condensation that can be a part of or contained within the gas-liquid fluid mixture of the Fluid C may be limited, and the Fluid B may represent the excess condensation generated within the thermal management system. The Fluid B may be directed toward a drainpipe or conduit 30 of the fluid management system. In the illustrated embodiment, the conduit is disposed proximate the bottom end of the housing and extends between the first end and the second end of the housing. Optionally, the conduit may be disposed within another portion or area of the housing, a portion of the conduit may be disposed outside of the housing, the entire conduit may be disposed outside of the housing, or any combination therein.

The Fluid C may be directed toward a channel 25 that may fluidly couple the thermal management system with a separator assembly 7. Optionally, two or more channels, passages, conduits, or the like, may fluidly couple the thermal management system with the separator assembly. In the illustrated embodiment of FIGS. 1 and 2, the thermal management system is disposed within the first portion of the housing, and the separator assembly is disposed within the second portion of the housing. For example, in the illustrated embodiment of FIGS. 1 and 2, the thermal management system and the separator assembly are completely disposed within the plural exterior surfaces that define the housing. Optionally, a portion of the thermal management system may be disposed outside of the housing, a portion of the separator assembly may be disposed outside of the housing, or any combination therein.

Figure 3:
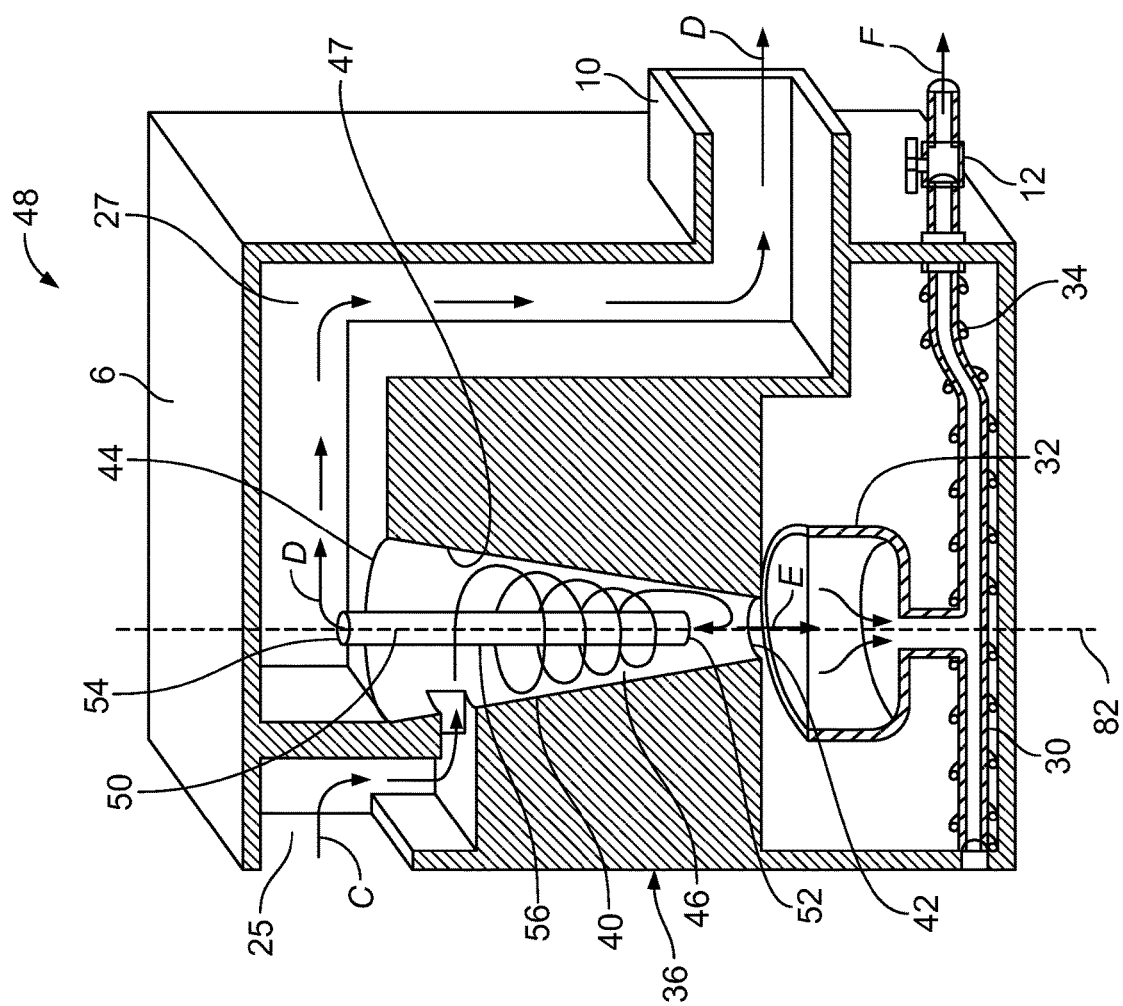
FIG. 3 illustrates a magnified view of a separator assembly of the fluid management system shown in FIG. 2.

FIG. 3 illustrates a magnified view of the separator assembly of the fluid management system. The channel 25 defines a fluid inlet 24. The channel and the fluid inlet may have any shape and/or size. The Fluid C (e.g., the fluid mixture including cooled compressed gas and the second fluid) is directed from the thermal management system into the separator assembly via the channel and fluid inlet. The Fluid C may be directed through the fluid inlet toward a separator 40. The separator includes a chamber 46 having a first end 44 and a second end 42 as the chamber extends along an axis 82. In one or more embodiments, the first end of the channel may also be referred to as a closed end of the channel, and the second end of the channel may be referred to as an open end of the channel. The chamber includes an opening 43 that is disposed proximate the first end of the chamber. The Fluid C (e.g., the fluid mixture of the cooled compressed gas and second fluid, such as condensation of the compressed gas) is directed from the thermal management system, through the channel 25, and into the chamber via the opening 43 of the chamber.

The chamber includes one or more interior surfaces 47 that defines the chamber. In the illustrated embodiment of FIGS. 2 and 3, the chamber has a circular cross-sectional shape, and a size of the circular cross-sectional shape decreases at increasing distances from the first end toward the second end of the chamber along the axis. For example, a distance between the interior surface of the chamber at a position proximate the first end may be greater than a distance between the interior surface of the chamber at a position proximate the second end. In one or more embodiments, the chamber may be referred to as a conical chamber. In the illustrated embodiment of FIGS. 2 and 3, the conical shape of the chamber gradually decreases in shape and size from the first end toward the second end of the chamber. Optionally, the chamber may have an alternative shape, such as including one or more steps along the axis such that the size of the chamber decreases in size from the first end to the second end.

The separator assembly includes a conduit that is disposed within the chamber and extends along the axis. The conduit includes a first open end 52 that is disposed proximate the second end of the chamber, and a second open end 54 that is disposed proximate the first end of the chamber. In the illustrated embodiment, the conduit extends in a substantially vertical direction, however may extend any orthogonal direction. The conduit has a substantially uniform size between the first open end and the second open end. Alternatively, the conduit may have a varying shape and/or size along a portion of the length of the conduit. The first open end of the conduit may be substantially flush or even with the second end of the chamber or may be disposed a distance away from the second end of the chamber and within the chamber. The second end of the conduit may be substantially flush or even with the first end of the chamber or may extend a distance past the first end of the chamber.

The Fluid C that moves into the separator assembly via the inlet and moves from the first end of the chamber toward the second end of the chamber. As the Fluid C moves within the chamber, the shape of the chamber imparts a centrifugal force onto the Fluid C, causing the Fluid C to spin and undergo centrifugation within the chamber. The centrifugation separates the first fluid from the second fluid of the fluid mixture. For example, a portion of the cooled compressed fluid may be separated from the condensation of the compressed fluid. For example, a liquid of the fluid mixture may separate from a gas of the fluid mixture. The centrifugation promotes the moisture or condensation to spin or move against the interior surface towards the outside of the chamber. The first fluid (e.g., the cooled compressed fluid) may have a density that is less than the second fluid, and the first fluid may remain and/or move in a direction toward the axis and toward an exterior surface of the conduit. The first fluid may spin, rotate, or move around the conduit that is disposed within the chamber. In the illustrated embodiment of FIGS. 2 and 3, as the area for airflow in the chamber decreases at increasing distances along the axis from the first end to the second end, the reduction in area causes the Fluid C to accelerate within the chamber. Optionally, the chamber may have a substantially uniform shape and/or size along the axis. In one or more embodiments, the chamber may have a cylindrical, conical, frustoconical, spherical, pyramidical, or the like, cross-sectional shape between the first end and the second end of the chamber.

The separator assembly may receive the fluid mixture (e.g., Fluid C) including the first fluid and the second fluid from the thermal management system. As the fluid mixture moves from the first end of the chamber toward the second end of the chamber, the first fluid separates from the second fluid responsive to the centrifugal forces directed onto the fluid mixture. The first fluid (e.g., the cooled compressed gas) may be directed into the first open end 52 of the conduit 50. A Fluid D (e.g., cooled compressed fluid with excess moisture removed from the fluid) may be directed through the conduit from the first open end toward the second open end of the conduit. The second open end of the conduit may be fluidly coupled with a channel 27. The Fluid D may be directed out of the conduit via the second open end of the conduit and directed through the channel toward an outlet 10. The outlet may be fluidly coupled with a destination 31, and the Fluid D may be directed out of the fluid management system and toward the destination.

The second fluid (e.g., the liquid or condensation) of the fluid mixture that is directed toward the interior surface of the chamber may collide with the interior surface of the chamber and is directed toward the second end of the chamber. In the illustrated embodiment of FIGS. 2 and 3, the second end of the chamber is fluidly coupled with a sump 32 such that the second fluid is directed out of the chamber and toward the sump. Optionally, the second fluid may be directed into another area, open space, collection device, or the like, that may collect, receive, contain, or the like, the second fluid responsive to the second fluid being directed out of the chamber. For example, the second fluid or a Fluid E may be collected within the sump that may be fluidly coupled with the conduit 30. The second fluid (e.g., the Fluid E) is combined with the exhaust of the thermal management system (e.g., the Fluid B) within the conduit to generate a Fluid F. The Fluid F (e.g., a combination or mixture of the Fluid B and Fluid E) may be directed out of the housing via an outlet 12. In one or more embodiments, the outlet may be coupled with or include a drain valve that may control a flow of the Fluid F that is directed out of the housing. For example, the drain valve may control a pressure, a flow rate, and/or an amount of the Fluid F that is directed out of the fluid management system.

In one or more embodiments, the fluid management system may include one or more thermal devices 34 that may control a temperature of one or more fluids within the system. As one example, one or more thermal devices may be disposed along, coupled with, or positioned proximate one or more positions of the conduit to control a temperature of the Fluid B, the Fluid D, and/or the Fluid F. As another example, one or more thermal devices may be disposed proximate the drain valve. As another example, one or more thermal devices may be disposed at one or more other positions along the channel 27 to control a temperature of the Fluid D that is directed out of the separator assembly. As another example, one or more thermal devices may be disposed at one or more positions proximate the separator 40, proximate one or more positions of the chamber of the separator assembly, or the like. The one or more thermal devices may be or include a trace heater, a blanket heater, or the like. In one or more embodiments, controlling the temperatures of the conduit, the sump, the drain valve, or the like, may allow the thermal management system and the separator assembly to function with compressor systems at ambient temperature ranges of at least −40° F. through 158° F.

Figure 6:
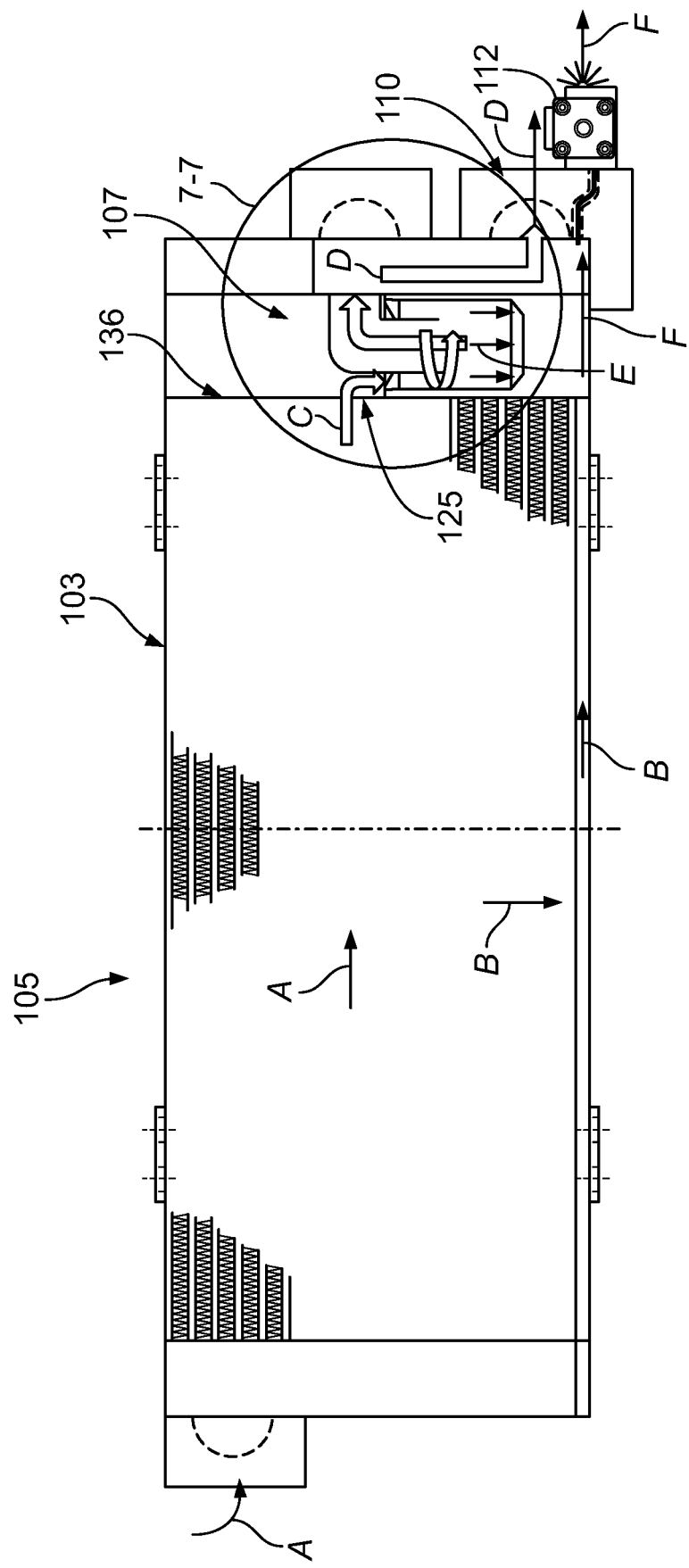
FIG. 6 illustrates a flow path of fluids within the fluid management system shown in FIG. 4.

FIG. 4 illustrates a top view of a fluid management system 102 in accordance with one embodiment. FIG. 5 illustrates a side view of the fluid management system. FIG. 6 illustrates a flow path of fluids within the fluid management system. FIG. 7 illustrates a magnified view of the flow path shown in FIG. 6. Like the fluid management system 2 shown in FIGS. 1 through 4, the fluid management system 102 includes a thermal management system 105 and a separator assembly 107 fluidly coupled with the thermal management system. The thermal management system and the separator assembly are disposed within a common housing 103 that includes plural exterior surfaces extending between a top end 158 and an opposite bottom end 160, a first end 162 and an opposite second end 164, a front side 166 and an opposite back side 168. In the illustrated embodiment, the thermal management system is disposed within a first portion of the housing proximate the first end, and the separator assembly is disposed in a second portion of the housing proximate the second end. The first portion of the housing may be separated from the second portion of the housing by one or more interior surfaces 136 or surfaces.

The Fluid A is directed into the housing and into the thermal management system via an inlet 108. As the Fluid A moves within the thermal management system, the Fluid A exchanges thermal energy with a coolant (not shown) that is disposed within and moves within the thermal management system. The Fluid B is generated responsive to the Fluid A exchanging thermal energy with the coolant, and the Fluid B is directed out of the thermal management system toward a conduit 130. The Fluid C, having a temperature that is less than a temperature of the Fluid A, and includes a second fluid (e.g., a portion of condensation generated responsive to the Fluid A exchanging thermal energy with the coolant) is directed out of the thermal management system and toward the separator assembly. For example, one or more channels 125 may be open passages within a wall or a surface 136 and extend between the thermal management system and the separator assembly.

The Fluid C is directed through a chamber 146 from a first end 144 of the chamber toward a second end 142 of the chamber. As the Fluid C moves within the chamber, the shape and size of the chamber promotes the first fluid of the fluid mixture to separate from the second fluid of the fluid mixture. For example, the first fluid may be a gas, and the second fluid may be a liquid, and movement of the fluid mixture within the chamber from the first end toward the second end may cause or promote the gas to separate from the liquid. The first fluid of the fluid mixture (e.g., a Fluid D) may be directed into a first open end of a conduit 150 proximate the second end of the chamber and be directed out of the separator assembly via an outlet 110. The second fluid of the fluid mixture (e.g., a Fluid E) is directed toward the second end of the chamber. The second end of the chamber is fluidly coupled with an opening or passage, and may fluidly couple the second end of the chamber with the conduit. The Fluid E may be combined, mixed with, or the like, the Fluid B (e.g., exhaust from the thermal management system) within the conduit to generate a Fluid F. The Fluid F may be directed out of the conduit and out of the housing via an outlet 112. The outlet may be coupled with or include a drain valve that may control the flow of the Fluid F that is directed out of the housing.

The fluid management system may include one or more thermal devices (not shown) that may be used to control a temperature of the Fluid B, the Fluid C, the Fluid D, the Fluid E, and/or the Fluid F. In one or more embodiments, one or more conduits directing one of the Fluids A through F may be oriented, positioned, configured, or the like, to extend a distance that is proximate one or more other conduits directing another of the Fluids A through F. The conduits may be disposed proximate each other, or within a predetermined distance away from each other, to reduce a number of thermal devices that may be used to control the temperatures of the Fluids A through F. For example, a single thermal device may be used to control the temperature of the Fluid D and the Fluid F.

Figure 10:
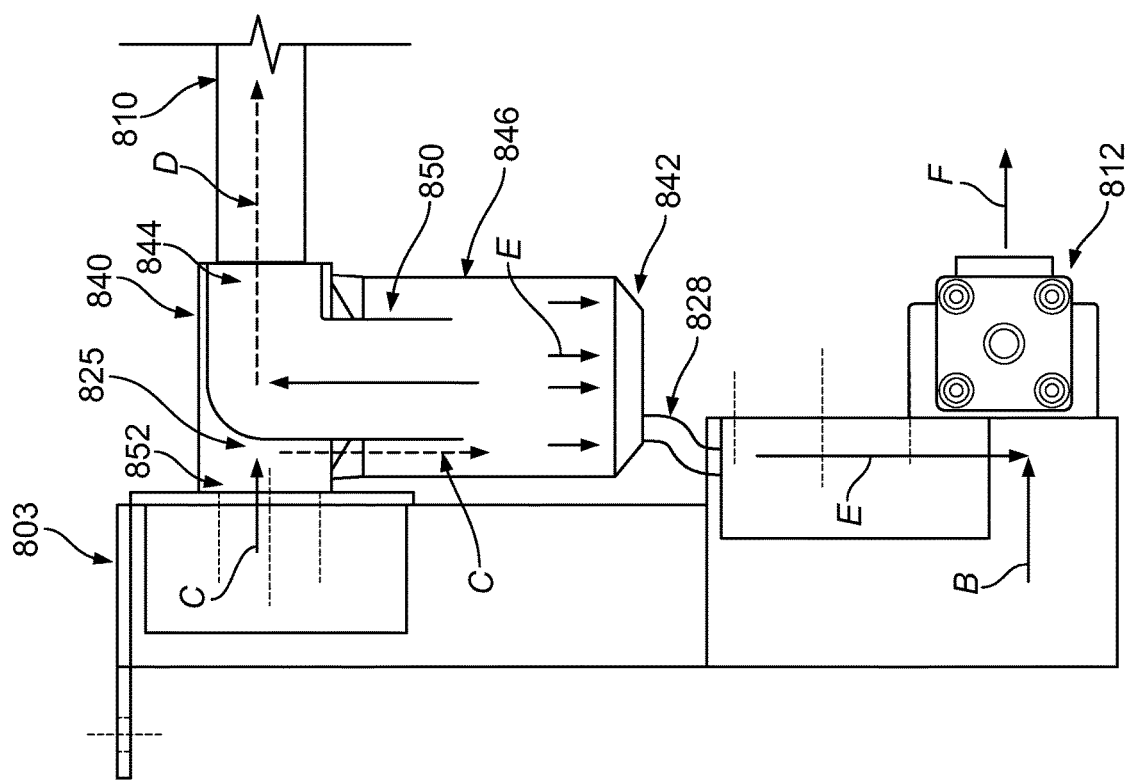
FIG. 10 illustrates a magnified view of a separator assembly of the fluid management system shown in FIG. 8.

FIG. 8 illustrates a top view of a fluid management system 802 in accordance with one embodiment. FIG. 9 illustrates a side view of the fluid management system. FIG. 10 illustrates a magnified view of a separator assembly 807 of the fluid management system. Like the fluid management systems 2 and 102 shown in FIGS. 1 through 7, the fluid management system includes a thermal management system 805 and the separator assembly 807. The thermal management system is disposed within a housing 803. The housing includes plural exterior surfaces that define the housing and extend between a top end 858 and an opposite bottom end 860, a first end 862 and an opposite second end 864, a front side 866 and an opposite back side 868.

The fluid management system 802 differs from the fluid management systems 2 and 102 by positioning the separator assembly in a body 840 that is disposed outside of the housing 803 of the thermal management system. In one or more embodiments, one or more surfaces of the body may be shared with a surface of the housing. For example, in the illustrated embodiment of FIG. 10, the housing of the thermal management system and the body of the separator assembly share a common or shared surface 852. Optionally, a portion of one or more surfaces of the body may be coupled with a portion of one or more surfaces of the housing. Optionally, the body may be disposed a predetermined distance away from the housing and one or more conduits or passages may extend between the housing and the body. For example, the distance between the housing and the body may be based on a temperature of the Fluid C that is directed from the thermal management system toward the separator assembly, a temperature or one or more other ambient temperatures of an area outside of the housing and the body, a type and/or amount of the Fluid C that may move within a channel 825 between the thermal management system and the separator assembly, a characteristic of the movement of the Fluid C (e.g., a flow rate, flow volume, an amount of turbulence of the flow of the Fluid C, or the like), a number of conduits or channels fluidly coupling the thermal management system and the separator assembly, a size of the one or more conduits or channels fluidly coupling the thermal management system and the separator assembly, a combination of two or more, or the like.

Like the fluid management system 102, the fluid management system 802 includes an inlet 808 that directs the Fluid A into the thermal management system. As the Fluid A moves within the thermal management system, the Fluid A exchanges thermal energy with a coolant (not shown) that is disposed within and moves within the thermal management system. Responsive to the Fluid A exchanging thermal energy with the coolant, the Fluid B is generated and/or formed, and is directed toward a conduit 830. The Fluid C is directed out of the housing of the thermal management system and into the body of the separator assembly via the channel 825. The Fluid C is directed into a first end 844 of a chamber 846 and moves toward a second end 842 of the chamber. As the Fluid C moves toward the second end of the chamber, the first fluid of the fluid mixture of Fluid C separates from the second fluid of the fluid mixture of Fluid C. For example, the gas (e.g., the first fluid) separates from the liquid (e.g., the second fluid) within the chamber. The first fluid separates from the second fluid based on the shape, size, orientation, and/or configuration of the chamber. For example, the chamber may have a conical, cylindrical, conical, frustoconical, spherical, pyramidical, or the like, cross-sectional shape between the first end and the second end of the chamber.

The Fluid D representing the first fluid separated from the second fluid, is directed through the conduit 850 and out of the chamber. The Fluid D may be directed through one or more conduits and toward an outlet 810 of the body of the separator assembly. The Fluid E representing the second fluid separated from the first fluid, is directed toward an outlet conduit 828. The outlet conduit 828 extends between the body of the separator assembly and the housing of the thermal management system. For example, the outlet conduit directs the Fluid E from a location within the body of the separator assembly toward a location within the housing of the thermal management system. The Fluid E may be combined with the exhaust or the Fluid B of the thermal management system within the conduit 830, and directed out of the housing of the thermal management system via an outlet 812. The outlet may be coupled with or include a drain valve that may control the flow of the Fluid F that is directed out of the housing.

In one or more embodiments, the fluid management system may include one or more thermal devices (not shown) that may be used to control a temperature of the Fluid B, the Fluid C, the Fluid D, the Fluid E, and/or the Fluid F. One or more thermal devices may be disposed within and/or coupled with the housing, other thermal devices may be disposed within and/or coupled with the body. Optionally, one or more thermal devices may be disposed between the housing and the body to control temperatures of the fluids that move within the housing and the separator assembly.

Figure 11:
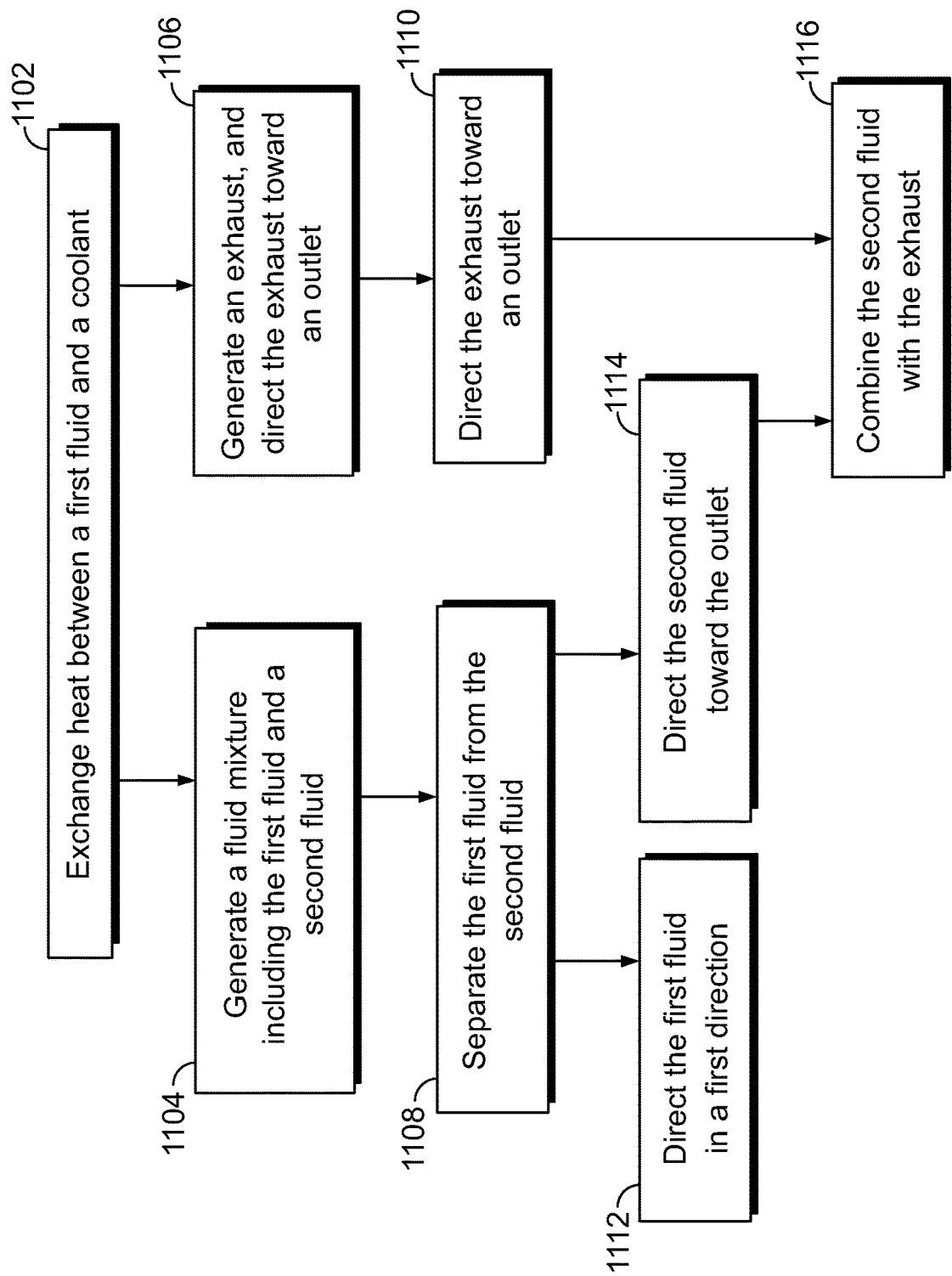
FIG. 11 illustrates a flowchart of a method of managing fluids of a fluid system.

FIG. 11 illustrates a flowchart of a method of managing fluids of a fluid system. At 1102, a first fluid exchanges heat or thermal energy with a coolant. As one example, the first fluid may exchange thermal energy with the coolant within a thermal management system. At 1104, a fluid mixture is generated responsive to the first fluid exchanging thermal energy with the coolant. The fluid mixture may include the first fluid and a second fluid. In one or more embodiments, the first fluid may be a gas, the second fluid may be a liquid, and the fluid mixture may be a gas-liquid mixture. Additionally, at 1106, an exhaust is generated responsive to the first fluid exchanging thermal energy with the coolant. At 1108, the exhaust may be directed toward an outlet.

Subsequent step 1104, at 1108, the first fluid may be separated from the second fluid. In one or more embodiments, the first fluid may be separated from the second fluid at a location that is downstream of a location where the first fluid exchanged heat with the coolant. In one or more embodiments, exchanging heat and separating the first fluid from the second fluid may occur in a common housing. Optionally, a portion of one of the exchanging of heat or separating the fluids may occur in different or separate housings that may be fluidly coupled with each other and disposed a predetermined distance away or apart from each other.

At 1112, the first fluid is directed in a first direction, and at 1114, the second fluid is directed in a different direction than the first fluid and toward the outlet. At 1116, the second fluid directed toward the outlet is combined or mixed with the exhaust. For example, the second fluid and the exhaust may be combined and directed out of the fluid system via a single or common outlet.

In one or more embodiments, the fluid management system may be a controlled system. For example, movement of the fluids, temperatures, or the like, of one or more of the thermal management system and/or the separator assembly may be controlled. Optionally, the movement of the fluids and/or operating temperatures of the thermal management system and/or the separator assembly may be uncontrolled.

In one or more embodiments, a fluid management system may include a thermal management system disposed within a housing. The thermal management system includes one or more conduits extending between a source of a first fluid and a destination of the first fluid. The first fluid may exchange heat with one or more cooling devices as the first fluid moves between the source and the destination. A fluid mixture including the first fluid and a second fluid may be generated responsive to the first fluid exchanging heat with the one or more cooling devices. The thermal management system may generate an exhaust responsive to the first fluid exchanging heat with the one or more cooling devices. The exhaust may be directed out of the thermal management system toward an outlet of the housing. A separator assembly may be fluidly coupled with and disposed downstream of the thermal management system. The separator assembly receives the fluid mixture from the thermal management system. The separator assembly may separate the first fluid of the fluid mixture from the second fluid and direct the first fluid in a first direction out of the separator assembly and direct the second fluid toward the outlet to be combined with the exhaust of the thermal management system.

Optionally, the separator assembly may include a body to be coupled with and disposed outside of the housing of the thermal management system.

Optionally, the fluid management system may include a thermal device operably coupled with the separator assembly. The thermal device may control a temperature of one or more of the first fluid, the second fluid, or the fluid mixture within the separator assembly, Optionally, the fluid management system may include a drain valve fluidly coupled with the outlet. The exhaust and the second fluid may be directed out of the fluid management system via the drain valve.

Optionally, the fluid management system may include a thermal device operably coupled with the drain valve. The thermal device may control a temperature of the exhaust and the second fluid.

Optionally, at least a portion of the separator assembly may be disposed within the housing of the thermal management system.

Optionally, the separator assembly may be disposed a predetermined distance away from the thermal management system.

Optionally, the first fluid is a gas, the second fluid is a liquid, and the fluid mixture is a gas-liquid mixture.

Optionally, the fluid management system may include a fluid system element that may control an amount of the first fluid that is directed between the source and the destination of the first fluid.

Optionally, the separator assembly may include a chamber having a first end and a second end. The fluid mixture may be directed into the chamber at the first end of the chamber and move from the first end of the chamber in a direction toward the second end of the chamber.

Optionally, the chamber may extend along an axis between the first end and the second end. A distance between one or more interior surfaces of the chamber at the first end is greater than a distance between the one or more interior surfaces of the chamber at the second end.

Optionally, the chamber may include a conical shape between the first end and the second end.

Optionally, the first fluid may separate from the second fluid within the chamber.

In one or more embodiments, a method includes exchanging heat between a first fluid that is directed between a source and a destination with one or more cooling devices. A fluid mixture is generated including the first fluid and a second fluid responsive to exchanging heat between the first fluid and the one or more cooling devices. An exhaust is generated responsive to exchanging heat between the first fluid and the one or more cooling devices. The exhaust may be directed toward an outlet. The first fluid of the fluid mixture is separated from the second fluid at a location downstream of a location of exchanging heat between the first fluid and the one or more cooling devices. The first fluid is directed in a first direction and the second fluid is directed toward the outlet to be combined with the exhaust.

Optionally, exchanging heat between the first fluid and the one or more cooling devices, generating the fluid mixture, and separating the first fluid of the fluid mixture from the second fluid may occur in a common housing.

Optionally, the method may include controlling an amount of the first fluid that is directed between the source and the destination.

Optionally, the first fluid is a gas, the second fluid is a liquid, and the fluid mixture is a gas-liquid mixture.

In one or more embodiments, a fluid system may include a thermal management system disposed within a housing. The thermal management system includes one or more conduits extending between a source of a gas and a destination of the gas. The gas may exchange heat with one or more cooling devices as the first fluid moves between the source and the destination. A fluid mixture including the gas and a liquid may be generated responsive to the gas exchanging heat with the one or more cooling devices. The thermal management system may generate a liquid exhaust responsive to the gas exchanging heat with the one or more cooling devices. The exhaust may be directed out of the thermal management system toward an outlet of the housing. A separator assembly may be fluidly coupled with and disposed downstream of the thermal management system. The separator assembly receives the fluid mixture from the thermal management system. The separator assembly may include a chamber extending between a first end and a second end along an axis. The fluid mixture may be directed into the chamber at the first end and move from the first end in a direction toward the second end. The separator assembly may separate the gas of the fluid mixture from the liquid within the chamber. The separator assembly may include one or more conduits that direct the gas out of the chamber in a first direction, and one or more conduits to direct the liquid out of the chamber and toward the outlet to be combined with the liquid exhaust of the thermal management system.

Optionally, the chamber may include one or more interior surfaces. A distance between the one or more interior surfaces at the first end may be greater than a distance between the one or more interior surfaces at the second end.

Optionally, the separator assembly may include a body that may be coupled with and disposed outside of the housing of the thermal management system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A fluid management system comprising:
a thermal management system disposed within a housing, the thermal management system comprising one or more conduits extending between a source of a first fluid and a destination of the first fluid, the first fluid configured to exchange heat with one or more coolant passages as the first fluid moves between the source and the destination, wherein a fluid mixture comprising the first fluid and a second fluid is generated responsive to the first fluid exchanging heat with the one or more coolant passages, the thermal management system configured to generate an exhaust responsive to the first fluid exchanging heat with the one or more coolant passages, the one or more conduits are configured to direct the exhaust out of the thermal management system toward an outlet of the housing; and
a separator assembly fluidly coupled with and disposed downstream of the thermal management system, the separator assembly configured to receive the fluid mixture from the thermal management system, the separator assembly configured to separate the first fluid of the fluid mixture from the second fluid and direct the first fluid in a first direction out of the separator assembly and direct the second fluid toward the outlet to be combined with the exhaust of the thermal management system.

2. The fluid management system of claim 1, wherein the separator assembly includes a body configured to be coupled with and disposed outside of the housing of the thermal management system.

3. The fluid management system of claim 1, further comprising a heating device operably coupled with the separator assembly, wherein the heating device is configured to control a temperature of one or more of the first fluid or the second fluid within the separator assembly.

4. The fluid management system of claim 1, further comprising a drain valve fluidly coupled with the outlet, wherein the exhaust and the second fluid are configured to be directed out of the fluid management system via the drain valve.

5. The fluid management system of claim 4, further comprising a heating device operably coupled with the drain valve, wherein the thermal device is configured to control a temperature of the exhaust and the second fluid.

6. The fluid management system of claim 1, wherein at least a portion of the separator assembly is disposed within the housing of the thermal management system.

7. The fluid management system of claim 1, wherein the separator assembly is disposed a predetermined distance away from the thermal management system.

8. The fluid management system of claim 1, wherein the first fluid is a gas, the second fluid is a liquid, and the fluid mixture is a gas-liquid mixture.

9. The fluid management system of claim 1, further comprising a fluid system element configured to control movement of the first fluid that is directed between the source and the destination of the first fluid.

10. The fluid management system of claim 1, wherein the separator assembly comprises a chamber having a first end and a second end, the fluid mixture configured to be directed into the chamber at the first end of the chamber and move from the first end of the chamber in a direction toward the second end of the chamber.

11. The fluid management system of claim 10, wherein the chamber extends along an axis between the first end and the second end, wherein a distance between one or more interior surfaces of the chamber at the first end is greater than a distance between the one or more interior surfaces of the chamber at the second end.

12. The fluid management system of claim 10, wherein the chamber comprises a conical shape between the first end and the second end.

13. The fluid management system of claim 10, wherein the first fluid is configured to separate from the second fluid within the chamber.

14. A method comprising:
exchanging heat between a first fluid that is directed between a source and a destination with one or more coolant passages;
generating a fluid mixture comprising the first fluid and a second fluid responsive to exchanging heat between the first fluid and the one or more coolant passages;
generating an exhaust responsive to exchanging heat between the first fluid and the one or more coolant passages, the exhaust is directed toward an outlet;
separating the first fluid of the fluid mixture from the second fluid at a location downstream of a location of exchanging heat between the first fluid and the one or more coolant passages; and
directing the first fluid in a first direction and directing the second fluid toward the outlet to be combined with the exhaust.

15. The method of claim 14, wherein exchanging heat between the first fluid and the one or more coolant passages, generating the fluid mixture, and separating the first fluid of the fluid mixture from the second fluid occurs in a common housing.

16. The method of claim 14, further comprising controlling an amount of the first fluid that is directed between the source and the destination.

17. The method of claim 14, wherein the first fluid is a gas, the second fluid is a liquid, and the fluid mixture is a gas-liquid mixture.

18. A fluid system comprising:
a thermal management system disposed within a housing, the thermal management system comprising one or more conduits extending between a source of a gas and a destination of the gas, the gas configured to exchange heat with one or more coolant passages as the gas moves between the source and the destination, wherein a fluid mixture comprising the gas and a liquid is generated responsive to the gas exchanging heat with the one or more coolant passages, the thermal management system configured to generate a liquid exhaust responsive to the gas exchanging heat with the one or more coolant passages, the one or more conduits are configured to direct the liquid exhaust out of the thermal management system toward an outlet of the housing; and
a separator assembly fluidly coupled with and disposed downstream of the thermal management system, the separator assembly configured to receive the fluid mixture from the thermal management system, the separator assembly comprising a chamber extending between a first end and a second end along an axis, the fluid mixture configured to be directed into the chamber at the first end and move from the first end in a direction toward the second end, the separator assembly configured to separate the gas of the fluid mixture from the liquid within the chamber, the separator assembly comprising one or more conduits configured to direct the gas out of the chamber in a first direction and one or more conduits configured to direct the liquid out of the chamber and toward the outlet to be combined with the liquid exhaust of the thermal management system.

19. The fluid system of claim 18, wherein the chamber comprises one or more interior surfaces, wherein a distance between the one or more interior surfaces at the first end is greater than a distance between the one or more interior surfaces at the second end.

20. The fluid system of claim 18, wherein the separator assembly includes a body configured to be coupled with and disposed outside of the housing of the thermal management system.

\* \* \* \* \*